United States Patent
Johnson et al.

(10) Patent No.: US 9,481,057 B2
(45) Date of Patent: Nov. 1, 2016

(54) METHOD FOR APPLYING HARDFACING TO A MATRIX SUBSTRATE OF A DRILL BIT

(71) Applicant: Varel International Ind., L.P., Carrollton, TX (US)

(72) Inventors: Charles Daniel Johnson, Porter, TX (US); Marvin Windsor Amundsen, Houston, TX (US)

(73) Assignee: VAREL INTERNATIONAL, IND., L.P., Carrollton, TX (US)

( * ) Notice: Subject to any disclaimer, the term of this patent is extended or adjusted under 35 U.S.C. 154(b) by 387 days.

(21) Appl. No.: 14/107,952

(22) Filed: Dec. 16, 2013

(65) Prior Publication Data

US 2014/0102011 A1 Apr. 17, 2014

Related U.S. Application Data

(63) Continuation of application No. 13/766,640, filed on Feb. 13, 2013, now Pat. No. 9,289,864.

(60) Provisional application No. 61/599,239, filed on Feb. 15, 2012.

(51) Int. Cl.
| | | |
|---|---|---|
| *B23K 10/00* | (2006.01) | |
| *B23P 15/28* | (2006.01) | |
| *B23P 6/00* | (2006.01) | |
| *E21B 10/46* | (2006.01) | |
| *B23P 25/00* | (2006.01) | |
| *E21B 10/55* | (2006.01) | |

(52) U.S. Cl.
CPC ............... *B23P 15/28* (2013.01); *B23P 6/00* (2013.01); *B23P 25/00* (2013.01); *E21B 10/46* (2013.01); *E21B 10/55* (2013.01); *Y10T 29/49737* (2015.01); *Y10T 29/49742* (2015.01)

(58) Field of Classification Search
CPC ........... B23P 15/28; B23P 6/00; B23P 25/00; E21B 10/46; E21B 10/55; Y10T 29/49737; Y10T 29/49742; H05H 1/34; H05H 1/42; B23K 10/027
USPC ................ 219/121.59, 121.47, 76.16, 76.15, 219/121.48
See application file for complete search history.

(56) References Cited

U.S. PATENT DOCUMENTS

| | | | |
|---|---|---|---|
| 5,348,770 A | 9/1994 | Sievers et al. | |
| 6,568,491 B1 | 5/2003 | Matthews, III et al. | |
| 2002/0035895 A1 | 3/2002 | Davies et al. | |
| 2008/0073125 A1* | 3/2008 | Eason | B22F 7/062 175/432 |
| 2010/0159157 A1* | 6/2010 | Stevens | B05B 7/222 427/569 |
| 2010/0187018 A1* | 7/2010 | Choe | B22D 19/14 175/426 |
| 2010/0314176 A1* | 12/2010 | Zhang | E21B 10/573 175/383 |
| 2011/0114394 A1* | 5/2011 | Lockwood | B22D 19/14 175/428 |
| 2013/0000982 A1* | 1/2013 | Olsen | B23K 35/0261 175/57 |
| 2014/0120011 A1* | 5/2014 | Eckert | G01N 1/31 422/536 |

* cited by examiner

*Primary Examiner* — Mark Paschall

(57) ABSTRACT

A method for hardfacing a drill bit includes applying a hardfacing material to a matrix metal forming the substrate of the drill bit. The hardfacing material is applied using a plasma arc welding process. A metallurgical bond is formed between the matrix metal and the hardfacing material. The matrix metal may include tungsten carbide and a braze filler metal.

16 Claims, 5 Drawing Sheets

METHOD FOR APPLYING HARDFACING TO A MATRIX SUBSTRATE OF A DRILL BIT

PRIORITY CLAIM

This application is a continuation application of U.S. patent application Ser. No. 13/766,640, entitled Method For Repairing or Reinforcing Cutter Pockets of a Drill Bit, filed on Feb. 13, 2013, which claims the benefit of U.S. Provisional Patent Application No. 61/599,239 filed on Feb. 15, 2012, and entitled Method For Repairing Cutter Pockets of a Drill Bit, the disclosures of each of which are hereby incorporated by reference.

TECHNICAL FIELD

The present invention relates generally to bits for drilling a wellbore, and more particularly to applying hardfacing material to a matrix substrate of a drill bit.

BACKGROUND

Drill bits used in earth boring operations undergo high stresses and forces. Drill bits, such as Polycrystalline Diamond Compact or Polycrystalline Diamond Cutter "PDC" bits, may be employed to drill through hard earth formations such as rock and coal, which may be abrasive and cause certain portions of the bit to erode. When material forming a pocket supporting the cutters erodes, cutters may become loose and may even separate from the bit and be lost in the wellbore. The loss of cutters reduces the drilling effectiveness of the bit, and their replacement may be costly and time consuming. To avoid loss of cutters, eroded bits may be repaired such that the cutter pockets are rebuilt to be able to support a replacement cutter.

Cutter pockets may be repaired using a puddle torch to apply a nickel based hardfacing material, such as TP MB40 powder available from Technogenia. These repaired PDC bits may continue to be susceptible to severe erosion when employed back in the field, which may be due to failure in the braze joint due to insufficient bonding. Failure of these bits may occur because there is a gap between the hardfacing material and the cutter that has been brazed into the pocket. This gap may occur because an oxide layer on the displacement plug impeded the hardfacing material from bonding directly to the outer surface of the plug and created a gap between the displacement plug and the hardfacing material. This gap may be filled with brazing material upon brazing the cutter into the pocket. The brazing material is more susceptible to erosion and failure during bit operation than the hardfacing material, which is generally stronger and tougher than the brazing material.

Reference is made to U.S. Pat. No. 6,568,491 to Matthews, III, which discloses the application of a refractory metal layer to a displacement plug before applying hardfacing material to the bit. However, application of the refractory metal layer is a time consuming and costly step in the process of repairing or reinforcing a drill bit.

Reference is also made to U.S. Patent Application Publication No. 2002/0035895 of Peter M. Davies, et al., which discloses application of hardfacing material to a drill bit without the use of a displacement and subsequently removing the hardfacing material to install a cutting element.

SUMMARY

In an embodiment, a method for repairing eroded pockets or reinforcing virgin pockets of a drill bit includes inserting a displacement plug in a cutter pocket formed in a substrate of a drill bit. A hardfacing material is applied to the substrate using a plasma arc welding process. The hardfacing material flows around and contacts an outer perimeter surface of the displacement plug.

According to one embodiment, the displacement plug is heated using the plasma arc welding process such that an oxide layer on the outer surface of the displacement plug is reduced, which allows molten hardfacing material to flow around and contact the perimeter surface of the displacement plug. The displacement plug may be formed of a graphite material, a silicate material, or a ceramic material, or other material that is stable under extremely high heat. In certain embodiments, the hardfacing material may flow over and contact at least a portion of the top surface of the displacement plug.

As an intermediate product in the creation of a repaired or reinforced drill bit, a blade of a drill bit includes a substrate, which supports a cutter pocket. A displacement plug is disposed in the cutter pocket. A hardfacing material is applied to the blade proximate the cutter pocket such that it contacts the outer perimeter surface of the displacement plug. The perimeter surface is formed of a material selected from the group consisting of a graphite material, a silicate material, and a ceramic material. In a preferred embodiment, the displacement plug is formed of a graphite material, such graphite. The original drill bit may be a used and eroded drill bit, or it may be an unused virgin drill bit.

Advantages of embodiments taught in this disclosure include the ability to form a dimensionally accurate cutter pocket that includes dimensionally accurate hardfacing material. Thus, a cutter that is brazed into the hardfaced cutter pocket will resist erosion and be less likely to become lose or lost during operation.

Further advantages of disclosed embodiments include the ability to create the dimensionally accurate hardfacing material with improved bonding to a cutter without having to apply a wetting material, such as a refractory metal, such as molybdenum to an outer surface of a displacement plug.

DETAILED DESCRIPTION OF THE DRAWINGS

Figure 1:
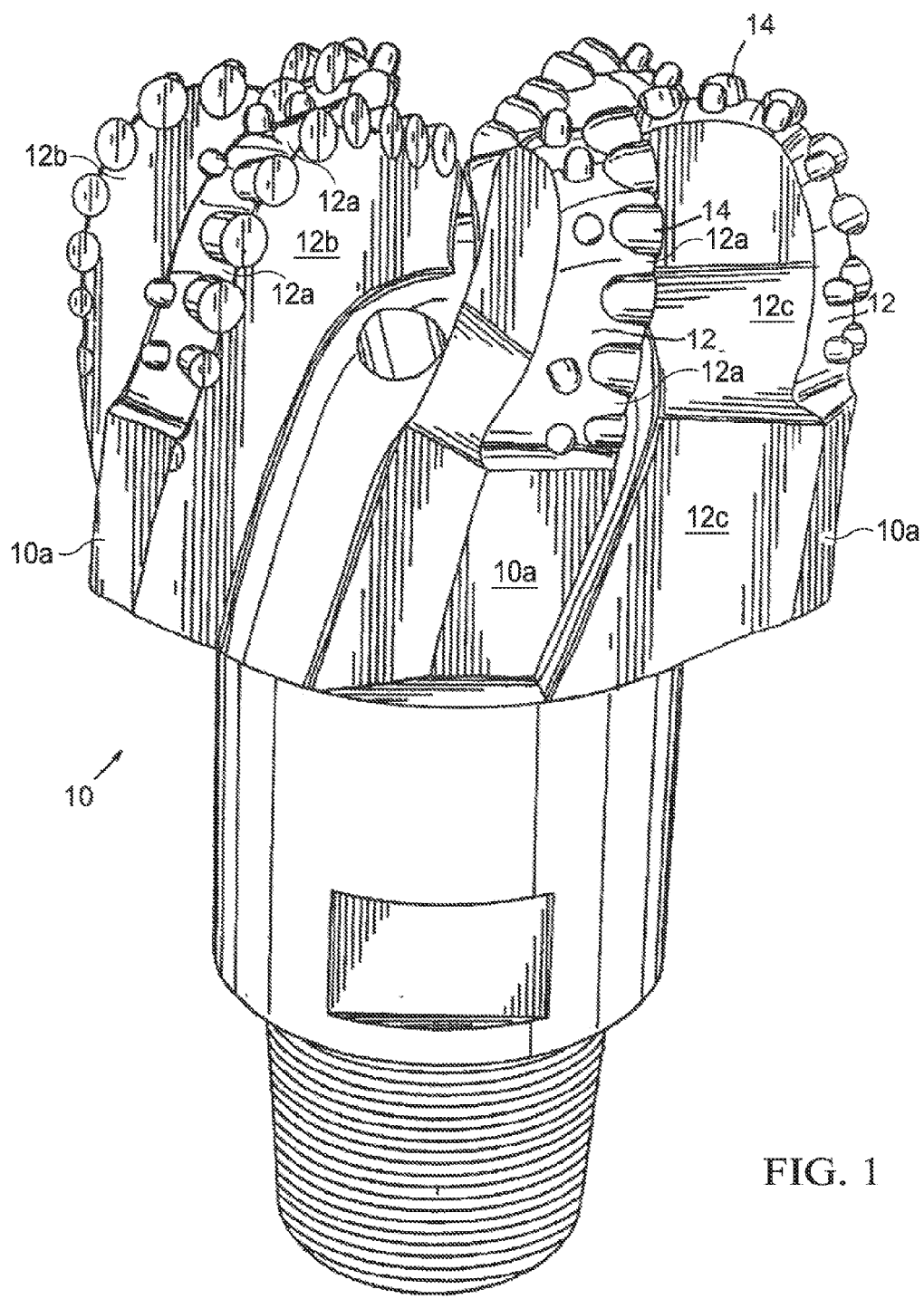
FIG. 1 is an isometric view of a PDC drill bit.

Reference is now made to FIG. 1, which shows an isometric view of an earth boring drill bit 10. The drill bit 10 comprises a plurality of blades 12. Each blade supports cutters 14. In certain embodiments, the cutters may be polycrystalline diamond compact ("PDC") cutters. In turn, the bit 10 may be referred to as a PDC bit. Each cutter 14 may have its superabrasive surface facing in approximately the same rotational direction to facilitate drilling as the bit 10 rotates into the earth. The blades 12 extend outwardly from a central rotational axis of the bit 10 to define the gage of the bit.

Figure 2:
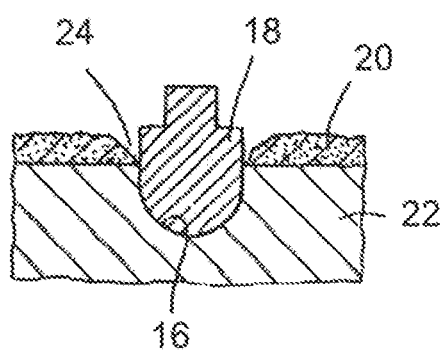
FIG. 2 is a cross section of a portion of a substrate of a bit blade including a cutter pocket, a displacement plug, and hardfacing material conventionally applied such that a gap is formed between the hardfacing material and the displacement plug.

The cutters 14 are brazed into pockets in the metal substrate making up the body of the bit 10. The bit substrate may be formed from steel, a matrix metal, or any other material suitable for earth boring drill bits. The matrix metal may include tungsten carbide. The tungsten carbide may be a powder brazed or infiltrated with a braze filler metal, which may comprise manganese, nickel, zinc, and/or copper. Once the bit 10 has been used for earth boring operations, portions of the substrate may erode causing the cutters 14 to become loose in the pockets, which may lead to loss of cutters. When refurbishing a bit that has eroded, it is often necessary to rebuild an eroded pocket such that it may once again support a cutter 14. The teachings of the present disclosure may also be employed to reinforce a pocket as a step in the fabrication of a new drill bit. As shown in FIG. 2, before rebuilding a pocket 16, a displacement 18, also referred to as a displacement plug, may be positioned in the eroded pocket 16 as a location tool or locator. The displacement 18 maintains the pocket as hardfacing material 20 is applied to rebuild or reinforce the pocket 16. The displacement 18 may be a plug formed from a graphite material, a silicate material, a ceramic material, or any other suitable material. In a preferred embodiment, the displacement 18 may be formed of a graphite material, such as graphite.

FIG. 2 shows a cross section of a pocket 16 of a bit being repaired or rebuilt using conventional techniques. In this stage of the rebuilding process, the pocket 16 supports the displacement 18, which has been tapped into the pocket 16 to create a temporary press or interference-type fit. With the displacement 18 positioned, hardfacing material 20 may applied to the substrate 22.

The hardfacing material 20 is applied to the outer surface of the substrate 22 of the bit. The hardfacing material 14 is customarily applied by heating a hardfacing powder or other material in a solid state to a molten state and applying it to the substrate 22 of the bit. In the molten state, the hardfacing material 20 bonds with the steel of the substrate 22 securing the hardfacing coating in place. This is often done using a flame spraying ("FLSP") or gas arc welding torch, which is sometimes referred to as a puddle torch. The puddle torch may generate approximate temperatures of 5,900° F.

The hardfacing material 20 typically does not flow over or wet well with or adhere to the material of the displacement plug 18. An oxide layer on the surface of the displacement 18 inhibits the flow of the hardfacing material 20 being applied with a puddle torch. The oxide causes the molten hard facing material to bead or ball up on the displacement plug 18. As a result, a gap 24 forms between the cured hardfacing material 20 and the external surface of the displacement plug 18.

Figure 3:
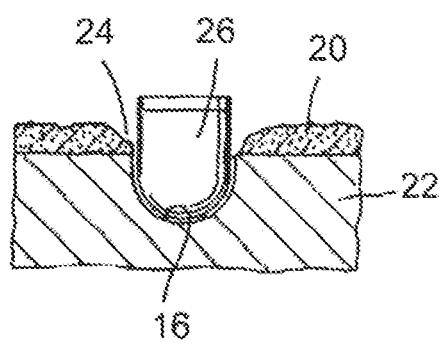
FIG. 3 illustrates the cross-section view of FIG. 2 with the displacement plug being replaced by a cutter.

After the hardfacing material 20 has been applied and cured, the displacement plug 18 is removed and a cutter 26 is inserted into the pocket 16 as illustrated in FIG. 3. The cutter 26 is secured within the bit pocket 16 by the application of a brazing material (not illustrated) or by other conventional techniques. The gap 24 between the hardfacing layer 20 and the body of the cutter 26, and any brazing material filling the gap 24 after brazing the cutter 26 in the pocket 16, is exposed to erosion during drilling operations. The brazing material is generally not as strong and resistant to erosion as the hardfacing material. Eventually, the loss of the material surrounding the cutter 26 causes the cutter to loosen the pocket 16.

Figure 4:
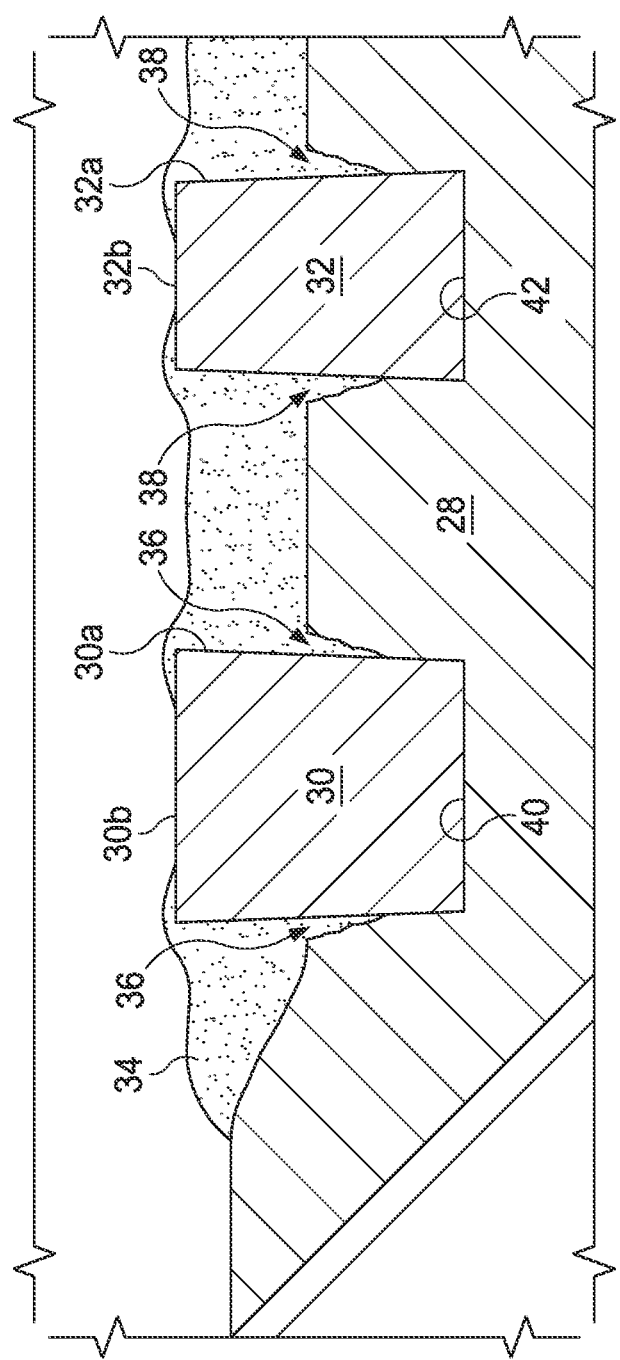
FIG. 4 illustrates a cross section of a portion of a substrate of a bit blade, displacement plugs, and hardfacing material applied according to the teaching of the present disclosure such that no gap is formed between the hardfacing material and the displacement plugs.

According to an embodiment of the present disclosure, a cutter pocket may be repaired (or reinforced) by applying a hardfacing material to a substrate supporting a displacement plug without creating a gap between the hardfacing material and the displacement. FIG. 4 is a cross section of a portion of a bit blade where the substrate 28 supports two graphite displacements 30, 32. A layer of hardfacing material 34 has been applied using a plasma arc welding ("PAW"), transferred arc method process. Using the PAW method of heating the hardfacing material allows the molten hardfacing to flow over the displacement 30, 32 such that the hardfacing material 34 directly contacts at least a perimeter surface 30a, 32a of the displacement 30, 32. Thus, there is no gap between the hardfacing material 34 and the displacement 30, 32 because the hardfacing material 34, in its molten state, flows over the displacement 30, 32 and may even flow down to fill gaps 36, 38, if they exist, between the displacement 30, 32 and the substrate 28.

This hardfacing technique is preferred over conventional hardfacing where the molten hardfacing material beads up upon contact with the displacement (see, FIG. 2). However, even when the PAW process is employed according to the teachings of the present disclosure, a metallurgical bond may not be formed between the displacement 30, 32 and the hardfacing material 34. Nevertheless, the improved flow of the molten hardfacing material 34 allows for a stronger bond between the hardfacing material 34 and replacement cutters that will be brazed in the pockets 40, 42 after the displacement plugs 30, 32 are chipped out. The PAW method creates the improved flow of the hardfacing material without the application of a wetting agent to the outer surface of the displacement. For example, U.S. Pat. No. 6,568,491 by Matthews, III, teaches the application of a refractory metal layer, such as a molybdenum layer, to the outer surface of a displacement to allow a hardfacing material to flow and harden closer to the displacement.

The hardfacing material 34 may be comprised of a mixture of tungsten carbide or other suitable materials that can provide a protective or abrasive coating, which is harder than the material of the substrate 28. In certain embodiments, the hardfacing material may be initially in the form of a powder comprising approximately 65% spherical tungsten carbide in a binder of nickel, copper, boron, and/or zinc. PAW may be used to apply hardfacing material to other portions of the bit including the gauge 10a, web 12a, face 12b, and backside 12c of the blade, and other areas requiring wear resistance (see FIG. 1).

Plasma arc welding employs a high energy, high current density process, which generates higher temperatures than traditional gas arc torch welding. The PAW process employs increased arc power and increased temperature over the gas arc torch process. The electric arc is formed between an electrode (which is usually but not always made of sintered tungsten) and the substrate. In PAW, the electrode is positioned within the body of the torch, which separates the plasma arc from the shielding gas envelope. The plasma is then forced through a fine-bore copper nozzle which constricts the arc and the plasma exits the orifice at high velocities (approaching the speed of sound) and a temperature approaching 20,000° C. PAW uses a non-consumable tungsten electrode and an arc constricted through a fine-bore copper nozzle.

Welding using the plasma arc process generates temperatures at the tip of the tungsten electrode of approximately 30,000 Fahrenheit. The increased arc power and temperature result from the constricting nozzle that is used in the PAW process.

The current associated with a plasma arc welding torch may be controlled to apply the appropriate heat for a given material thickness. The current may range from 0.1 to 200 amps. Lower heat inputs and lower amperage may be applied in a thin web area in order to affect a repair. Other variables of the PAW process which may be controlled include weld speed, which is the speed at which the PAW torch is moved in inches per minute. This weld speed may be controlled to sufficiently heat the substrate and avoid or minimize warpage. Other variables of the PAW process that may be controlled include the powder feed rate. Precise control of the powder feed rate may balance the powder feed rate with the heat input (current), to allow for appropriate wetting of the base metal, while providing a weld pool which can melt the hardfacing powder material.

The increased heat produced by the PAW process reduces the oxide on the displacements 30, 32, which allows the molten hardfacing material to better flow over the perimeter surface 30a, 32a of the displacements 30, 32. This is true regardless of whether the displacements 30, 32 are formed of graphite, silicate, or a ceramic material. The reduction in oxide allows the hardfacing material 34 to wet and flow over and against the displacements 30, 32, as opposed to beading up due to the oxide (compare FIG. 4 to FIG. 2). The resulting hardfacing material 34 is more dense and less porous than hardfacing material applied with traditional gas arc torch welding methods.

Because of the oxide reduction, the hardfacing material encapsulates the displacements. The displacement is encapsulated because the hardfacing 34 directly contacts the outer perimeter surface 30a, 32a and/or the top surface 30b, 32b of the displacement 30, 32. Encapsulation creates a mechanical bond between the displacement 30, 32 and the hardfacing material 34 that is not created if there is a gap between the hardfacing and the displacement, as shown in FIG. 2. The coverage of the displacement 30, 32 may be partially or completely over a top surface 30b, 32b of the displacement 30, 32. In certain embodiments, partial coverage of hardfacing 34 over the top surface 30b, 32b of the displacement 30, 32 ensures that minimum or no gap will be disposed between the displacement 30, 32 and the hardfacing 34, and a portion of the top surface 30b, 32b continues to be visible such that the displacement may easily be removed. However, gap reduction or elimination may result even if no hardfacing 34 flows over the top surface 30b, 32b of the displacement 30, 32.

The resulting pockets 40, 42 repaired and/or initially formed using the PAW process have a sound metallurgical bond between the hardfacing material and the base metal of the substrate 28. In addition, neither the hardfacing material 34 nor the substrate 28 shows porosity, voids, inclusions, or other detrimental intermetallics.

Figure 7:
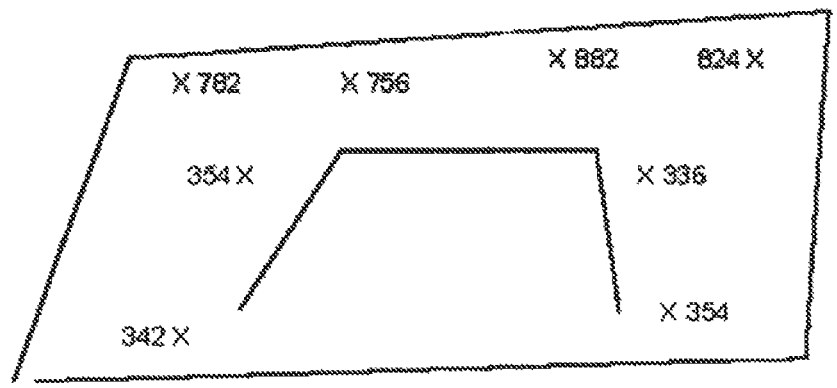
FIG. 7 illustrates Vickers hardness test results showing the structural integrity of a bit blade where hardfacing material has been applied according to the teaching of the present disclosure.

Metallurgical test results, as shown in FIG. 7, show the structural integrity of the hardfacing material and the substrate applied using PAW. The values shown were taken from a specimen, which was ground, polished, and etched to ASTM E3 requirements. FIG. 7 represents Vickers hardness values taken from a cross section including a displacement and single pocket configuration similar to that shown in FIG. 4. The X's illustrate locations where hardness was measured and the internal lines represent the displacement 30. Four hardness measurements were taken on the hardfacing material 34, and four hardness measurements were taken on the steel substrate 28 of the cross-sectioned cutter. The values evidence the structural integrity of a drill bit where cutter pockets have been repaired using the PAW process.

Application of hardfacing material using PAW may also rebuild or reinforce adjacent pockets. This technique applies hardfacing material to substrate portions between adjacent pockets. These portions may be webs of substrate material in the range of 1/16 to 1/8 inch thick. When these webs wear away during drilling operations, they may be rebuilt and restored by application of hardfacing material using the PAW process.

Figure 5:
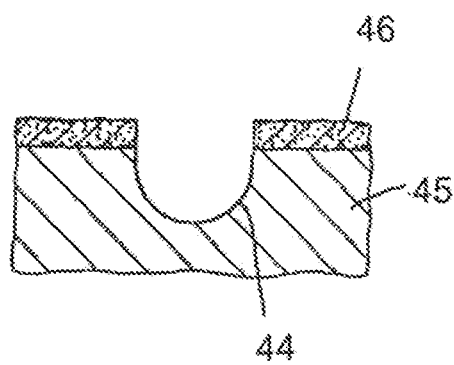
FIG. 5 illustrates a cross section of a portion of a substrate of a bit blade and hardfacing material applied according to the teaching of the present disclosure.
Figure 6:
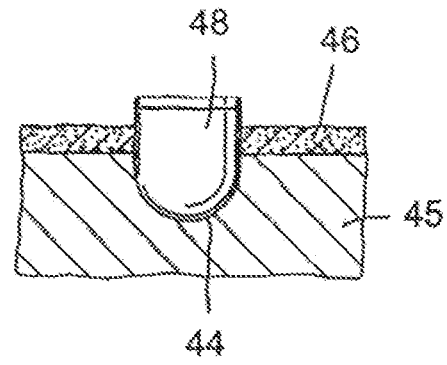
FIG. 6 illustrates a cross section of a portion of a substrate of a bit blade with hardfacing material applied according to the teaching of the present disclosure and including a replacement cutter brazed into the pocket.

FIG. 5 shows a cross-section including a pocket 44 of a cutter that has been repaired or initially formed using the PAW method disclosed. The displacement has been chipped out along with the hardfacing material that had flowed over the top surface of the displacement, if any, due to the PAW process. A more dimensionally accurate pocket is created using the PAW hardfacing process than conventional methods of hardfacing. Deburring sizing and cleaning operations prepare the pocket for a cutter to be brazed or otherwise secured into the pocket 44. As shown in FIG. 6, the cutter 48 that is brazed into the repaired pocket 44 is fully supported by the hardfacing material 46 because there is no gap between the hardfacing material 46 and the cutter 48, unlike the gap that is often left using conventional hardfacing methods, as shown in FIG. 3.

The brazed cutter 48 forms a strong metallurgical bond with the hardfacing material 46 and with the base metal of the substrate 45. As a result, superior braze integrity may be achieved over conventional techniques.

Embodiments of the invention have been described and illustrated above. The invention is not limited to the disclosed embodiments.

What is claimed is:

1. A method for reinforcing a drill bit defining a gauge portion and having at least one blade defining a face and a backside, having a plurality of cutter pockets formed therein, and having a web portion formed between adjacent cutter pockets, comprising:
   applying a hardfacing material, using a plasma arc welding process, to a substrate of the at least one blade, the substrate comprising a matrix metal, the hardfacing material applied to the web portion of the at least one blade;
   forming a metallurgical bond between the matrix metal and the hardfacing material; and
   after forming the metallurgical bond, securing a plurality of polycrystalline diamond compact cutters into the respective cutter pockets.

2. The method of claim 1 wherein securing the plurality of polycrystalline diamond compact cutters comprises brazing the cutters into the respective cutter pockets.

3. The method of claim 1 wherein the matrix metal comprises tungsten carbide.

4. The method of claim 3 wherein the matrix metal comprises a braze filler metal.

5. The method of claim 4 wherein the braze filler metal is selected from a group consisting of manganese, nickel, zinc, and copper.

6. The method of claim 1 wherein the hardfacing material comprises tungsten carbide and is harder than the matrix metal.

7. The method of claim 1 wherein the hardfacing material is also applied to the face of the at least one blade.

8. The method of claim 7 wherein the hardfacing material is also applied to the backside of the at least one blade.

9. The method of claim 8 wherein the hardfacing material is also applied to the gauge portion.

10. The method of claim 6 wherein the hardfacing material comprises spherical tungsten carbide in a binder.

11. The method of claim 10 wherein the binder is selected from a group consisting of nickel, copper, boron, and zinc.

12. The method of claim 1 wherein the plasma arc welding process comprises heating a tip of an electrode within a plasma arc welding torch to approximately 30,000 degrees Fahrenheit.

13. The method of claim 1 wherein the plasma arc welding process comprises forcing plasma through an arc-constricting nozzle of a plasma arc welding torch.

14. The method of claim 1 wherein the plasma arc welding process includes an electrode comprising tungsten.

15. The method of claim 14 wherein the electrode comprises sintered tungsten.

16. The method of claim 1 wherein the plasma arc welding process is a transferred arc process.

\* \* \* \* \*